United States Patent Office 3,531,317
Patented Sept. 29, 1970

3,531,317
PROCESS FOR HARDENING POLYESTER MOULD-ING AND COATING MASSES BY ELECTRON IRRADIATION
Manfred Patheiger, Krefeld-Uerdingen, and Clemens Niehaus and Otto Bendszus, Krefeld, Germany, assignors to Farbenfabriken Bayer Aktiengesellschaft, Leverkusen, Germany, a corporation of Germany
No Drawing. Filed July 15, 1968, Ser. No. 744,672
Claims priority, application Germany, Aug. 3, 1967, F 53,131
Int. Cl. C08f 1/20, 1/24, 45/14
U.S. Cl. 117—93.31          3 Claims

ABSTRACT OF THE DISCLOSURE

Customarily when preparing polyester moulding and coating masses or compositions, a small amount of wax or paraffin is added. When curing takes place, the wax ordinarily comes to the surface to form a layer to protect the composition from air inhibition. This effect is not realized when using electron beam curing. In the method of this invention, the wax containing composition is first irradiated with ultraviolet light, thus beginning the cure and allowing the wax to surface. After the protective wax layer is formed, the curing is finished using electron beam irradiation.

---

The invention relates to an especially advantageous process for hardening polyester moulding and coating masses by electron irradiation.

Since, for about 15 years, suitable sources of electron irradiation are available, the initiation of polymerisations by irradiation of polymerisable starting materials, thus also the hardening of polyester moulding and coating masses, with electron rays has acquired substantial significance. A detailed description of this technique can be found, for example, in the publication, "On the Utilization of Irradiation Processing in Surface Coating and Related Applications," by the firm, Radiation Dynamics Inc., Westbury Industrial Park, Westbury, N.Y. 11590, to which a comprehensive literature index is also added.

The special advantage of this hardening process lies chiefly in the extremely short period of time required; as a rule, the hardening times last only a few seconds and may decrease in individual cases to fractions of one second. With the exception of special, so-called air-drying types, there becomes manifest in the production of films, foils and coatings of polyester moulding and coating masses, even when hardening by electron irradiation and also when initiating the polymerisation by radical-forming polymerisation catalysts, optionally with the concurrent use of accelerators, or by irradiation with ultra-violet rays with the use of photosensitizers, the influence of oxygen inhibiting the polymerisation with the result that the surfaces, which are in contact with the air, do not completely harden, i.e., these surfaces do not become sufficiently hard, they can still be attacked by solvents and may even remain tacky.

In the case of the customary processes it is known that this difficulty can be obviated by adding small amounts of wax- or paraffin-like substances to the polyester moulding masses. When the polymerisation has started, a protective film is formed on the surfaces which are in contact with the air and this prevents the access of air so that also the surface layers completely harden. However, when the polymerisation is initiated by the action of electron rays, the formation of such a protective film does not take place, i.e., the formation of not completely hardened surface layers when coming into contact with the air can in this case not be prevented even by the addition of wax- or paraffin-like materials to the polyester moulding and coating masses.

The object of the invention comprises a process for the production of hardened films, foils and coatings by irradiation of appropriate layers of polyester moulding and coating masses, i.e., of solutions of unsaturated polyesters in copolymerisable monomers, with electron rays, a process not having the above disadvantage. This process is characterised by photogelling in known manner the layers of known wax- or paraffin-containing polyester solutions before the electron irradiation with the use of photo-sensitizers and optionally of peroxide catalysts and accelerators.

Since thin layers of polyester moulding and coating masses already gel within a few seconds with the use of suitable photo-sensitizers when irradiated with ultraviolet rays and, in contradistinction to the irradiation with electron rays, a protective film is formed on the surfaces if waxes and paraffins were added to the polyester masses, it is possible according to the present process to produce, in a very brief period of time, completely hardened films, foils and coatings of polyester moulding and coating masses also in the surface layers without the exclusion of air.

Within the scope of the invention, polyester moulding and coating masses comprise solutions of unsaturated polyesters, i.e., condensation products of $\alpha,\beta$-unsaturated dicarboxylic acids, such as maleic acid and fumaric acid, optionally in admixture with other dicarboxylic acids, such as succinic acid, adipic acid, phthalic acid and the like, or their anhydrides, with polyhydric alcohols, especially diols, such as ethylene glycol, propylene glycol, polyethylene glycols, hexane-1,6-diol etc., in copolymerisable monomers, particularly styrene.

According to the invention, the usual amounts of known photo-sensitizers are added to the above polyester moulding and coating masses. There may be mentioned, for example, sulphur-containing compounds, such as dithiocarbamates, trithiocarbonates, thiuram compounds, thiazoles and xanthates (cf., for example, U.S. patent specification No. 2,673,151 and German patent specification No. 1,037,132), as well as aromatic disulphides (cf., for example, German published patent specification 1,233,594), furthermore $\alpha$-phenyl-acetophenone derivatives (cf., for example, French patent specification No. 1,450,589), e.g., benzil and benzoin (cf., for example, "The Magazine of Applied Engineering," June 1961, pp. 39–46), and benzoin ethers (U.S. patent specifications Nos. 2,448,828 and 2,722,512), such as benzoin-methyl, -ethyl, -n-propyl and -isopropyl ethers.

As mentioned above, the moulding and coating masses to be used according to the invention also contain wax- and paraffin-like materials in the usual quantities.

In some cases it may be advantageous to further add to the moulding masses a conventional peroxide catalyst, e.g., a diacyl peroxide, such as benzoyl peroxide, or a hydroperoxide, e.g., a ketone-hydroperoxide, such as methyl ethyl ketone or cyclohexanone peroxide, and a suitable accelerator, e.g., a tertiary aromatic amine, or a heavy metal salt, preferably a cobalt salt, such as cobalt naphthenate.

Clear lacquers, undyed or dyed, are especially suitable for the process, but also pigmented lacquers may be used, if desired.

The polyester moulding and coating masses provided with the above additives are then cast on to a substrate to give films, foils or coatings which are briefly irradiated by a source of light which emits strong ultraviolet rays, e.g., a mercury vapour lamp, a tungsten or xenon lamp. Dependent upon the strength of the source of light and its distance from the cast layer, gelling then occurs within about a half minute to about 3 minutes with the formation of a protective film on the surface of the layer.

The gelled layer is then subjected to an electron irradiation. The accelerator voltage has to be adjusted to the thickness of the layer. It can range from about 150 to 3000 kv. In general, an accelerator voltage between about 200 and about 600 kv. is the most suitable. The electron ray current should, as a rule, have a strength between about 1 and 25 ma. Dependent upon the intensity of the irradiation and the distance of the source of the electron rays from the layer to be hardened, the latter is thereafter completely hardened within a few seconds.

EXAMPLE

A polyester coating mass consisting of a 60% by weight solution of a polyester obtained from 152 parts by weight maleic anhydride, 141 parts by weight phthalic anhydride and 195 parts by weight propane-1,2-diol with an acid number 47 and an additive of 0.045 part by weight hydroquinone, in monostyrene, to which 2 percent by weight benzoin ethyl ether and 1.5 percent by weight of a 10% solution of paraffin (melting range 52–54° C.) in toluene were added, is applied with 500 g./sq. meter to a wooden plate veneered, for example, with walnut and irradiated with the ray of a fluorescent tube for blueprints (e.g., Philips' fluorescent lamp TLM, 125 W/05 RS; order No. 109, 1250). The period of time after which a reflecting paraffin film has been formed, depends upon the distance between the lacquer coating and the fluorescent tube. At a distance of 5 cm. it amounts to about 45 seconds, at a distance of 10 cm. to about 90 seconds. Subsequently, the lacquer coating which lies on a conveyor belt is allowed to pass through under the scanner of an electron irradiation installation. In an irradiation installation having an accelerator voltage of 300 kv., an electron ray current of 20 ma., a distance of about 10 cm. between the transparent window and the lacquer coating and a conveyor belt speed of 2.50 metre per minute, one passage is sufficient to harden the lacquer coating to such an extent that it can be ground and polished. The surface can no longer be attacked by solvents, such as acetone and ethyl acetate.

The results of further experiments with the use of other photo-sensitizers and different distances between fluorescent lamp and object are set out in the table below. When applying an amount of 500 g./m.$^2$, a coherent paraffin film is obtained according to the irradiation times given in the table.

| 3% by weight sensitizer | Distance between fluorescent lamp/lacquer coating | |
|---|---|---|
| | 5 cm. | 10 cm. |
| Diphenyl-disulphide | 90″ | 135″ |
| Di-o-xylene-disulphide | 160″ | 200″ |
| α-Ethyl-benzoin | 40″ | 65″ |
| Benzoin-ethyl ether | 30″ | 40″ |
| 4,4′-dimethyl-benzoin-ethyl ether | 40″ | 60″ |
| Benzoin-n-propyl ether | 30″ | 35″ |
| Benzoin-n-butyl ether | 30″ | 40″ |
| Benzoin-n-hexyl ether | 30″ | 40″ |
| Benzoin-isopropyl ether | 30″ | 40″ |

When the experiment is repeated with the same polyester coating mass, but without the content of the photosensitizer benzoin-ethyl ether, then the lacquer film shows, after the electron irradiation, a glossy surface since a separation of paraffin has not taken place. Although the surface feels dry, it can easily be scratched with a fingernail and, when attempted to be ground, it immediately renders the abrasive paper ineffective. It can, moreover, also be attacked by solvents, such as acetone and ethyl acetate.

What is claimed is:

1. Process for the production of hardened films, foils and coatings from solutions of unsaturated polyesters which are condensation products of α,β-unsaturated dicarboxylic acids and polyalcohols, in polymerizable monomers containing minor amounts of waxes or paraffins which comprises adding to said solutions a photosensitizer, irradiating said solutions as layers with UV-rays until the waxes or paraffins have formed a protective film on the surface and then hardening the gelled films, foils or coatings by irradiating them with electron rays.

2. Process of claim 1, wherein a peroxide catalyst is additionally added to the solution.

3. Process of claim 2, wherein an accelerator for the catalyst is additionally added to the solution.

References Cited

UNITED STATES PATENTS 3,008,387  11/1961  Wittenwyler et al. 117—161 XR
3,051,585  8/1962  Weinberg et al. 117—161 XR
3,294,869  12/1966  Robinson 260—878

RALPH S. KENDALL, Primary Examiner

J. H. NEWSOME, Assistant Examiner

U.S. Cl. X.R.

117—161; 204—159.15; 260—861